United States Patent
Bhavineni et al.

(10) Patent No.: US 10,275,266 B1
(45) Date of Patent: Apr. 30, 2019

(54) LANGUAGE ACCEPTANCE TESTING

(71) Applicant: SAP SE, Walldorf (DE)

(72) Inventors: Bhavani Bhavineni, Vijayawada (IN); Gokulkumar Selvaraj, Coimbatore (IN); Knut Stargardt, Weinheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/828,446

(22) Filed: Dec. 1, 2017

(51) Int. Cl.
  *G06F 9/00* (2006.01)
  *G06F 9/451* (2018.01)
  *G06F 17/28* (2006.01)

(52) U.S. Cl.
  CPC ........... *G06F 9/454* (2018.02); *G06F 17/289* (2013.01); *G06F 17/2854* (2013.01)

(58) Field of Classification Search
  CPC .................................. G06F 9/454; G06F 11/25
  USPC ......................................................... 717/137
  See application file for complete search history.

(56) References Cited

U.S. PATENT DOCUMENTS

| | | | |
|---|---|---|---|
| 6,453,462 B1* | 9/2002 | Meade | G06F 9/454 717/124 |
| 7,299,452 B1* | 11/2007 | Zhang | G06F 17/2223 704/8 |
| 2004/0205721 A1* | 10/2004 | Colaiuta | G06F 9/454 717/124 |
| 2005/0137844 A1* | 6/2005 | Voruganti | G06F 11/3684 704/2 |

\* cited by examiner

*Primary Examiner* — Daniel Abebe
(74) *Attorney, Agent, or Firm* — Fish & Richardson P.C.

(57) ABSTRACT

Various embodiments of systems and methods for language acceptance testing (LAT) for an application are described herein. The method includes executing the application in a base language based upon a test script. While executing the application, metadata of the application is automatically extracted and one or more screenshots of the one or more UIs of the application is automatically captured in the base language. Based upon the extracted metadata and the test script, the application is re-executed in a foreign language supported by the application. One or more screenshots of the same one or more UIs of the application is captured in the foreign language. A list for each captured UI is generated including visual and/or non-visual text(s) of an UI, in the base language and corresponding foreign language. The captured screenshots and the generated lists are stored in a database for language testing.

20 Claims, 10 Drawing Sheets

| INDEX | ENGLISH (EN) | DUTCH (DE) |
|---|---|---|
| 1 | USER | BENUTZER |
| 2 | PASSWORD | KENNWORT |
| 3 | LANGUAGE | SPRACHE |
| 4 | DE-DEUTSCH | DE-DEUTSCH |
| 5 | EN-ENGLISH | EN-ENGLISH |
| 6 | HU-MAGYAR | HU-MAGYAR |
| ... | ... | ... |
| 8 | LOG ON | ANMELDEN |

ERROR TYPES TO RAISE INCIDENT

- ○ UI – DISPLAY UI
- ○ TRT – TRUNCALED TEXT
- ● TRA – ACCURACY
- ○ MTR – MISSING TRANSLATION

LANGUAGE ACCEPTANCE TESTING

BACKGROUND

A software application, including one or more user interfaces (UIs), may be rendered in different languages to be used globally. Usually, the software application is translated into different languages so that it may be rendered in respective different languages. The translated software application is required to be tested linguistically to ensure the correctness of the translation, e.g., in context of business domain for which the software application is developed, etc. Generally, language acceptance testing (LAT) is performed manually to ensure the correctness of the translation. A language tester is required to have knowledge of the language and the application domain. For example, a software application meant for farmers across different regions needs language testers who know the regional languages and have the knowledge of application domain (e.g., farming) to test the correctness of translation (i.e., localized or translated application) in context of farming. Further, the language testers are also required to have knowledge of functionalities of the application to proceed from one UI of the application to another to properly check the translation of the entire application. Therefore, usually, the language testers are provided training in domain and functionalities of the application.

However, providing training is a time consuming, costly, and an arduous task which makes language testing or LAT a slow, time-consuming, and costly process. Further, if language testers find issues, they have to put in effort and time to write the issue description, attach screenshots of the UIs, etc., to convey it to the application developers, which again is a time consuming and an arduous task.

BRIEF DESCRIPTION OF THE DRAWINGS

The embodiments are illustrated by way of examples and not by way of limitation in the figures of the accompanying drawings in which like references indicate similar elements. The embodiments may be best understood from the following detailed description taken in conjunction with the accompanying drawings.

DESCRIPTION

Embodiments of techniques for language acceptance testing are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

"Application" refers to a program coded for specific purpose or use. For example, an application may refer to a program coded for creating sales order (SO), creating purchase order (PO), maintaining employees' information or record, etc. An application may include multiple user interfaces (UIs) and each UI comprises one or more UI elements, e.g., pull or drop-down menu, label, text field, etc.

"Document object model (DOM) characteristics of an UI element" refers to visual, non-visual, and geometrical characteristics of the UI element. For example, non-visual characteristics such as an id of the UI element, type of the UI element (e.g., text, numeric, etc.), privacy (read-only, editable, etc.) of the UI element, and class of the UI element, visual characteristics such as a label of the UI element, text or value within the UI element, placeholder (default value) of the UI element, and geometrical characteristics such as position (e.g., x, y co-ordinates) of the UI element on the UI, etc. An exemplarily DOM characteristics of an UI element (e.g., a label and its corresponding text input field) may be expressed as: <id="sdc-inner" placeholder="Select SDC" value=" " type="text" readonly="readonly" class="InputBaseInner">.

"X-path" refers to an expression extracted from the DOM characteristics of the UI element which uniquely identifies the UI element. For example, the x-path extracted from the DOM characteristics (id="sdc-inner" placeholder="Select SDC" value=" " type="text" readonly="readonly" class="InputBaseInner") may be "id="sdc-inner"" which uniquely identifies the UI element. X-path may include one or multiple elements from the DOM characteristics of the UI element to uniquely identify the UI element. In an embodiment, the x-path of the UI elements uniquely identifies the UI elements irrespective of the language of the application. If the x-path of the UI element is known, its DOM characteristics (visual, non-visual, and geometrical characteristics) may be accessed.

"Metadata" refers to data or information related to UI elements. For example, metadata includes DOM characteristics of the UI elements, x-path of the UI elements, label information or label of the UI elements, functional information (e.g., data or entered value or text) of the UI elements, etc.

"Base language" refers to a language in which an application is originally rendered. Typically, the base language may be a language of a country or a place where the application is developed or marketed. Often, the base language may be "English".

"Foreign language" refers to a language other than the base language which an application supports. For example, if a base language for an application is English, then a foreign language for the application can be any non-English language which the application supports such as Dutch, French, etc. In various embodiments, the foreign language may be referred to as "other language" or "translated language".

"Test script" or "test automate" refers to a set of instructions or steps which may be followed or executed to check or test the functionality of an application (e.g., whether the application is working as expected). The test script may describe expected outcome in response to user's input or action on a UI element, data type allowed for the UI element, the UI or screen to be accessed next, etc. The test script may be generated by recording user's (e.g., developer's) navigation steps while executing/testing the application (e.g., while functional testing of the application during development phase). In an embodiment, once the test script is generated and the execution is triggered (e.g., by pressing an execute button), the application is automatically executed in a back-end, based upon the generated test script. Typically, the recorded steps (user's navigation) are replayed while automatically executing the application. In an embodiment, the application may be automatically executed in base language and simultaneously or successively re-executed in other languages. In an embodiment, the developer may require to turn on an "LAT" tab/button and then trigger execute button to execute the application in base language and re-execute the application, simultaneously or successively, in other languages. In an embodiment, re-executing the application may also be referred as replaying the application in other languages.

"Functional test system" or "test automation system" refers to a module (e.g., logical and/or physical unit) for testing functionalities of an application (i.e., functional testing of the application). The test automation system automatically executes an application, based upon its corresponding test script or test automates. In an embodiment, the test automation system renders or displays a test result such as whether the functional testing of the application (based upon a test script) is successful, unsuccessful, or has error(s), etc.

"List_&_screen capturing module" refers to a logical and/or a physical unit which automatically: (i) captures screenshots of various UIs of an application (e.g., screenshot of each UI of the application), simultaneously or successively, in base language (e.g., English) and in other languages while executing the application at the time of functional testing (e.g., executing the application in the base language and replaying in other languages), and (ii) generates a list corresponding to the captured UI or screenshots, the list includes texts (e.g., words, sentences, and labels etc.) of corresponding captured UI or screenshots, in the base language (e.g., English), and correspondingly, in other languages (e.g., Dutch). In various embodiments, the list may be referred as "text comparator".

Embodiments enable optimized language acceptance testing (LAT), e.g. by automatically capturing screenshots of various UIs of an application (e.g., screenshot of each UI of the application), simultaneously or successively, in base language (e.g., English) and in other languages supported by the application. Screenshots are automatically captured during functional testing of an application (e.g., by executing the application in the base language and replaying the application in other languages). The screenshots captured in various languages (e.g., English, French, Dutch, etc.) are stored in a database. Further, a list (text comparator) is automatically generated for corresponding UIs or screenshots (e.g., later or while capturing the screenshots). The list includes visible and/or non-visible texts (e.g., texts provided as drop-down menu options) of the UI or screenshot of the application, in base language (e.g., English) and in other languages supported by the application (e.g., French. Dutch, etc.). A language tester is provided the generated list and the captured screenshots to check translation. The language tester can check whether the texts in the list are correctly translated (e.g., linguistically correct by comparing the texts in the base and translated language in the list). There may be one list per captured UI or screenshot so that it is easy for the language tester to check the texts per UI in its proper context.

The generated list may be color coded to quickly differentiate new texts in the list and/or the texts already used in one or more previous lists or screenshots. For example, if a word in the list is previously used (e.g., which is already used in one or more previous screenshots or lists) then the word may be coded in green color and a new word or first time used word in the list may be coded in red color so that the language tester can quickly check the new word (red-colored word) and ignore the already checked words (green-colored words). It saves time and makes process more efficient as there is no need to check the redundant texts in the list. Further, if the language tester finds any mismatch in the list (e.g., mismatch in the base language and the translated language texts), the language tester can verify, refer, or confirm from the corresponding screenshots (e.g., in the base language and in the translated language). The screenshots in the base language and in the translated language to-be-tested may be provided side-by-side, adjacent, or in a spilt screen, to make it easy to verify or confirm any mismatch or other discrepancy in UI elements, e.g., size, positioning of an UI element, etc. Therefore, the language tester just needs to refer to the lists and the screenshots to perform language testing and there is no need to spend effort, time, and other resources to provide functional and domain related training to the language testers. Additionally, if there are any issues or discrepancy (e.g., labels are not aligned properly, translation is incorrect, etc.), the tester can easily and quickly raise an issue (e.g., by pressing a button and selecting a type of error from a drop-down menu to automatically raise an issue or incident). Once a type of error is selected by the language tester, a ticket or incident may be automatically raised including required description details (e.g., metadata and screenshots). Therefore, the language tester needs not spend time composing the description, attaching or enclosing required screenshot(s), etc., to explain the issue to development and/or translation teams.

In one embodiments, the language tester may be authorized to access a translation system and directly correct the translation. Moreover, in various embodiments, a LAT dashboard may be coupled to a test-work bench so that: (i) test cases assigned by a test coordinator (e.g., through the test work bench) may be accessed/received directly by the language testers from the LAT dashboard; and (ii) result or statuses of the language testing (e.g., whether language testing is in-progress, successfully finished, issues identified, translation corrected, ticket raised, etc.) are updated, automatically or manually, in the test work bench for test coordinator to refer to. Therefore, there is no need for the language tester to switch from testing system (LAT dashboard) to the test work-bench system to update the test result/statuses.

Figure 1:
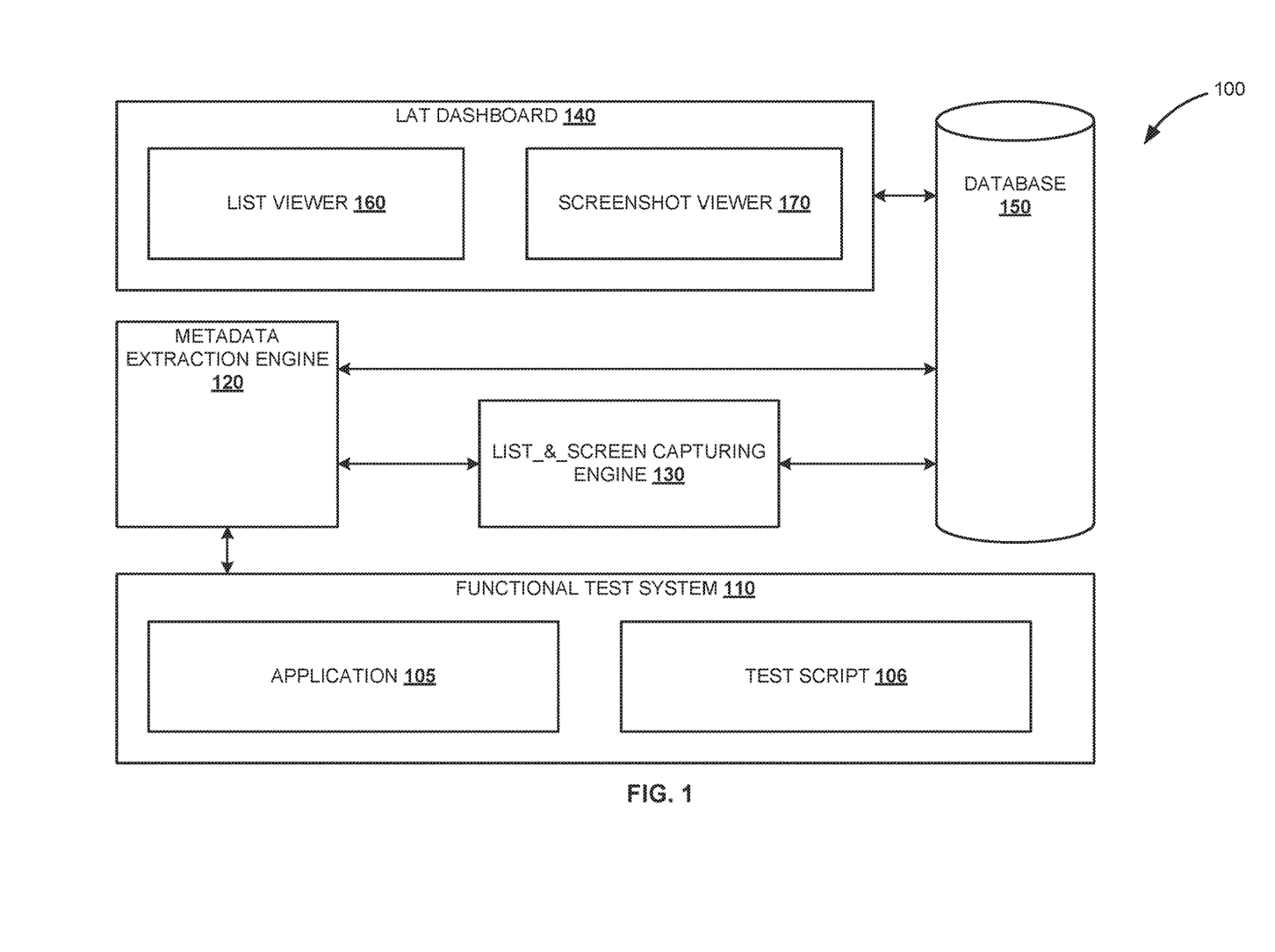
FIG. 1 is a block diagram illustrating language testing environment comprising functional test system and language acceptance testing (LAT) dashboard for optimized language acceptance testing, according to an embodiment.

FIG. 1 is a block diagram illustrating exemplary language testing environment 100 for optimized language testing, according to an embodiment. The environment 100 includes functional test system 110, metadata extraction engine 120, list_&_screen capturing engine 130, and LAT dashboard 140. The functional test system 110 performs functional testing of application 105. e.g., by executing the application 105, based upon its corresponding test script 106. In an embodiment, an LAT tab or button is provided on the functional test system 110 interface (not shown) which may be triggered or turned ON. In an embodiment, the LAT tab may be triggered prior to triggering execute button (not shown) for performing or executing functional test. When the LAT button is triggered and then the execute button is triggered for functional testing of the application 105, the metadata extraction engine 120 and the list_&_screen capturing engine 130 communicates with the functional test system 110. While performing functional testing of the application 105 (e.g., while executing the test script 106 in base language), the metadata extraction engine 120 captures various metadata related to the application 105 (e.g., metadata related to various UI elements of the application 105). The extracted metadata (e.g., x-path of UI elements) may be used for execution of the test script 106 in other languages (e.g., multiple languages that application 105 under functional test supports).

In an embodiment, the application 105 is executed (based upon its test script 106) in the base language and re-executed in other languages. Once the test script 106 is executed in the base language and re-executed in other languages, screenshots or UIs of the application 105 are captured. The screenshots of the application are captured by the list_&_screen capturing module 130. In an embodiment, the screenshots of the application 105 may be captured, simultaneously or successively, in the base language (e.g., English) and other languages supported by the application. A list corresponding to each captured UI or screenshot is generated. The list includes visible and/or non-visible texts (e.g., words, sentences, and labels, etc.) used in the respective UI or screenshot, in base language (e.g., English) and in other languages (e.g., French, Dutch, etc.). The captured screenshots and lists are stored in database 150. In an embodiment, the captured screenshots are segregated based upon language. The language tester may access the stored metadata of the application 105 (e.g., metadata of the UI elements, generated lists, and the captured screenshots, etc.) from the database 150 to easily and quickly refer to the list and compare the screenshots in the base and translated languages. In an embodiment, the screenshot in the base and translated language is provided side-by-side or in split window/screen so that the language tester can easily compare. The list is displayed on list viewer 160 and the screenshots are displayed on screenshot viewer 170 of the LAT dashboard 140. In an embodiment, when the language tester selects the language in which the application is to be tested, the list and screenshots segregated for that language is automatically retrieved from the database 150 and displayed on the LAT dashboard 140 for the language tester to compare and verify the correctness of translation (i.e., localized version of application).

An application (e.g., the application 105) comprises multiple UIs or screens and a UI comprises one or more UI elements, e.g., pull or drop-down menu, label, text field, etc. A UI element has a visual, non-visual, and/or geometrical characteristics (e.g., DOM characteristics) through which it may be identified. A UI element may include visible and/or hidden or non-visible texts. For example, the options (texts) provided through drop-down menu (UI element) is hidden until the drop-down menu is selected.

Once the application 105 is developed, a developer may generate a test script (e.g., the test script 106) for the application 105. The test script 106 may be a set of instructions or steps to be executed to operate the application 105. For example, the test script 106 describes which step is to be taken next to move to a next screen or UI. The test script 106 may be generated by recording developer's navigation steps, e.g., by a recording engine (not shown), while executing/testing the application 105. A functional testing of the application 105 may be performed using the test script 106 to check the functionality of the application 105 (i.e., whether the application is working as expected or not). A functional test system (e.g., the functional test system 110) may be used for functional testing of the application 105.

Figure 2:
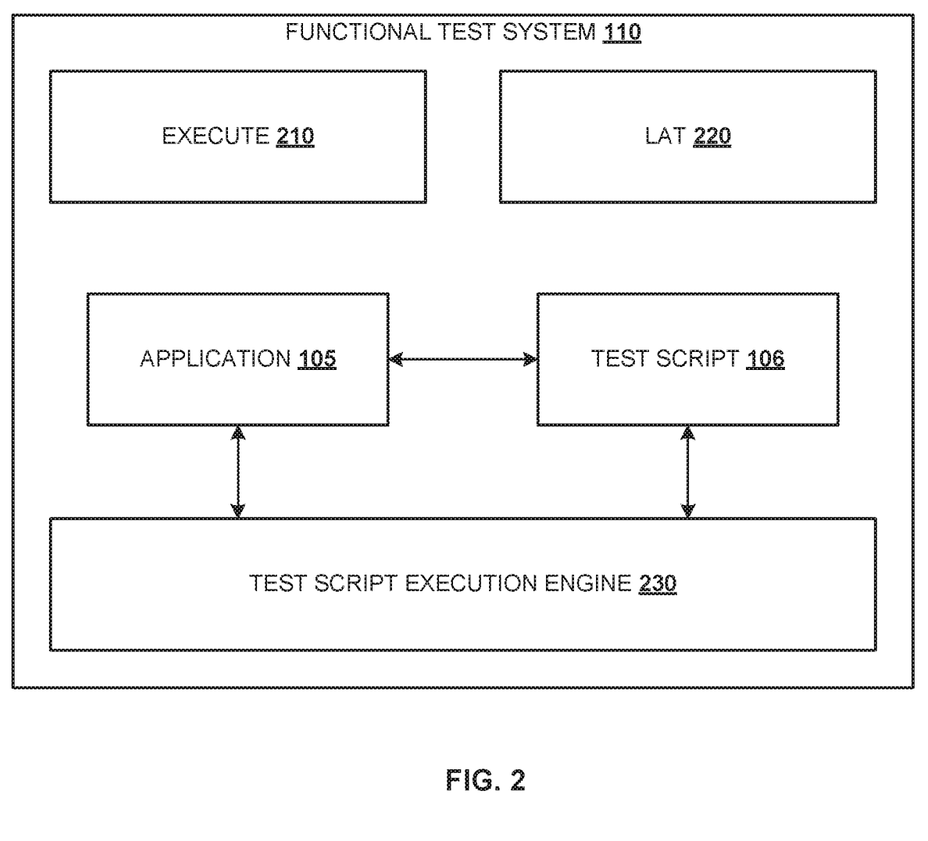
FIG. 2 is a block diagram illustrating the functional test system, according to an embodiment.

FIG. 2 illustrates an exemplarily functional test system 110 for functional testing of the application 105, according to an embodiment. The functional test system 110 may include execute button or tab 210 and LAT tab 220. In an embodiment, when the execute tab 210 is triggered, the application 105 is executed (e.g., in base language) based upon the test script 106. The test script 106 is executed by test script execution engine 230. In an embodiment, the developer or functional tester triggers the LAT tab 220 (e.g., set the LAT flag ON) and then triggers the execute tab 210. When the LAT tab 220 is triggered prior to the execute tab 210, the test script 106 is executed in base language and also replayed in other multiple languages supported by the application 105. In an embodiment, the application is executed in the base language first (based upon the test script 106) and then re-executed or replayed in other languages.

In an embodiment, while executing the application 105 in the base language, metadata of the application 105 is extracted. The metadata of the application refers to metadata of its UI elements. For example, metadata may be x-path of the UI elements. The UI elements may be uniquely identified through their respective x-path irrespective of the language of the application. In an embodiment, the metadata may be extracted by the metadata extraction engine (e.g., the metadata extraction engine 120 of FIG. 1). In an embodiment, the metadata extraction engine may be a part of the functional test system 110 (e.g., part of the test script execution engine 230). The extracted metadata (x-path) may be stored in the database 150. The extracted metadata may be used for execution of the test script 106 in other languages (e.g., multiple languages supported by the application under functional test). In an embodiment, using the extracted metadata such as x-path the test script 106 is re-executed or replayed in other languages. The test script 106 may be replayed automatically in other languages while executing the application 105 in the base language. In an embodiment, the application 105 is automatically executed in base language and re-executed, simultaneously or successively, in other languages, based upon the test script 106 and extracted metadata (x-paths).

In an embodiment, while executing the application 105 in the base and other languages, the list_&_screen capturing engine 130 captures screenshots or UIs of the application 105 (e.g., in the base and corresponding other multiple languages). In an embodiment, the screenshots of the application 105 may be captured simultaneously in the base language (e.g., English) and other multiple languages. The list_&_screen capturing engine 130 also automatically generates a list for each captured UI or screenshot. The list includes visible and/or non-visible texts used in the UI or screenshot of the application. The list includes the texts, in the base language (e.g., English) and in corresponding other multiple languages (e.g., French. Dutch, etc.). The captured screenshots and the generated lists are automatically stored in the database 150.

Figure 3:
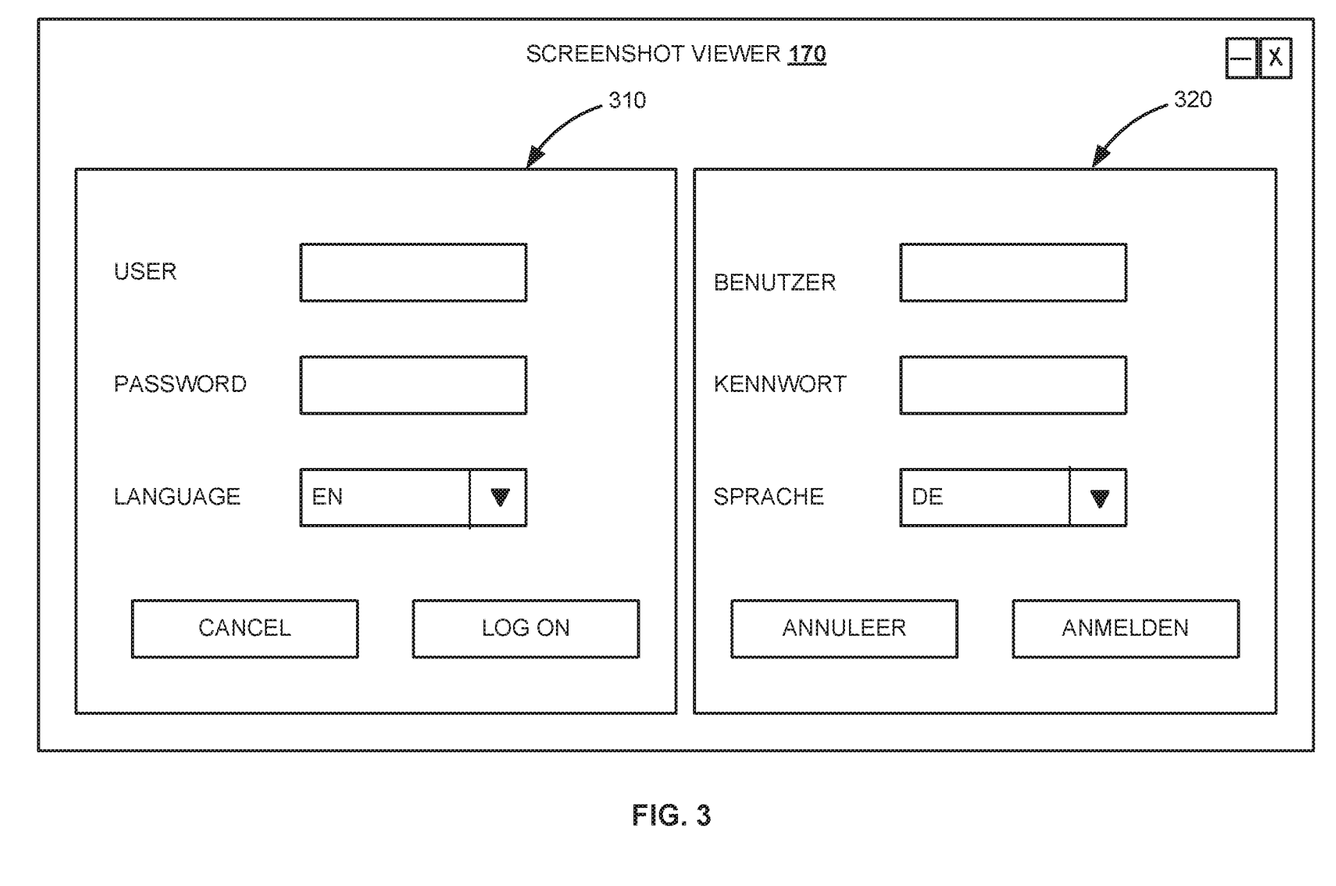
FIG. 3 illustrates exemplarily screenshot viewer displaying screenshots of a user interface (UI) of an application captured by list_&_screen capturing engine, in base language (English) and translated language (Dutch), according to an embodiment.

FIG. 3 illustrates exemplary screenshot viewer 170 displaying screenshots 310 and 320 captured for a UI (not shown) of an application, in the base language (English) and Dutch, respectively. In an embodiment, the screenshot 310 in the base language (English) may be captured prior to the screenshot 320 for the same UI in Dutch. In another embodiment, the screenshot 320 in Dutch may be captured simultaneously while capturing the screenshot 310 in the base language (English). In another embodiment, based upon screen size and multi-language ability of a tester, the screenshots may be displayed in the base language and multiple languages at the same time to save time for multiple language translation testing.

Figure 4:
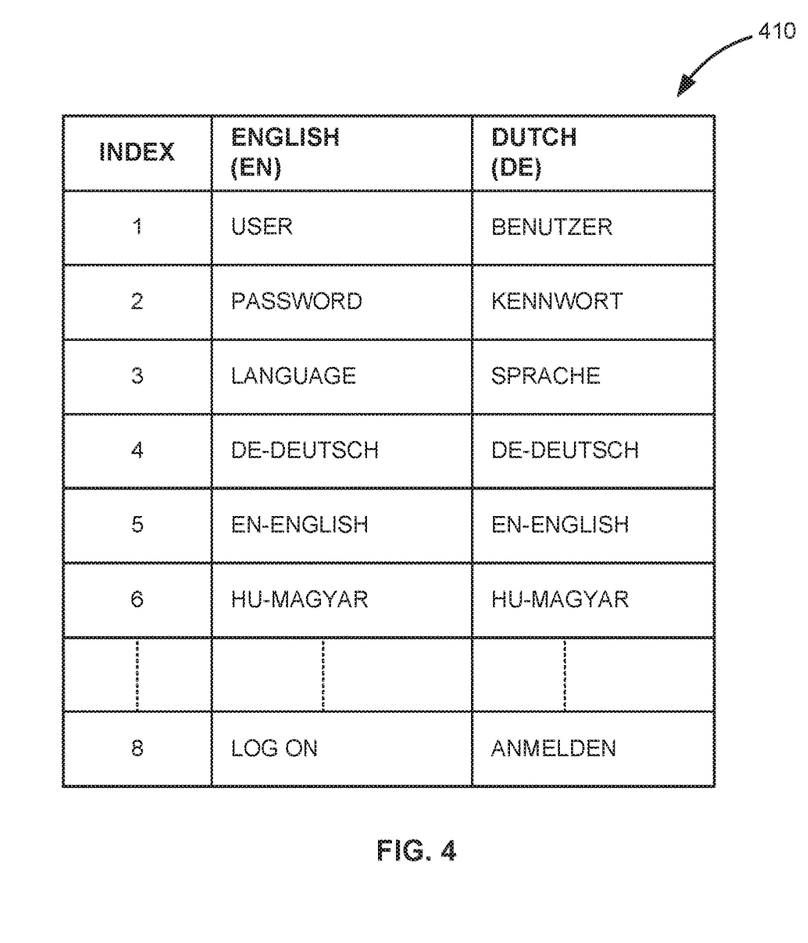
FIG. 4 illustrates an exemplarily list generated, by the list_&_screen capturing engine, for the captured UI of FIG. 3, according to an embodiment.

FIG. 4 illustrates an exemplarily list 410 generated for the captured screenshots 310 and 320 by the list_&_screen capturing engine 130, according to an embodiment. As shown, the list 410 includes one or more texts in the base language English (EN) and Dutch (DE). For example, the list 410 includes text such as "user", "password", and "language" and its corresponding translated text in Dutch as "benutzer", "kennwort", and "sprache", respectively. Similarly, there may be respective list for the other captured screenshots or UIs of the application. In an embodiment, the list may be color coded to distinguish the texts which are new in the list and which are already used in one or more previous lists or UIs. For example, if a word in the list is already used in one or more previous lists (screenshots) then that word may be coded in "green" or "blue" whereas a word which is new (first time used in the list) may be coded in red color.

The captured screenshots (e.g., the screenshots 310 and 320 of FIG. 3) and its corresponding list (e.g., the list 410 of FIG. 1) may be stored in the database (e.g., the database 150 of FIG. 1). The stored screenshots and list may be accessed from the LAT dashboard (e.g., the LAT dashboard 140 of FIG. 1). The LAT dashboard 140 is an interface where the language testers can analyze a result (e.g., the captured screenshots and lists) and in case of any discrepancy, mismatch, or inconsistency can raise issue(s).

Figure 5:
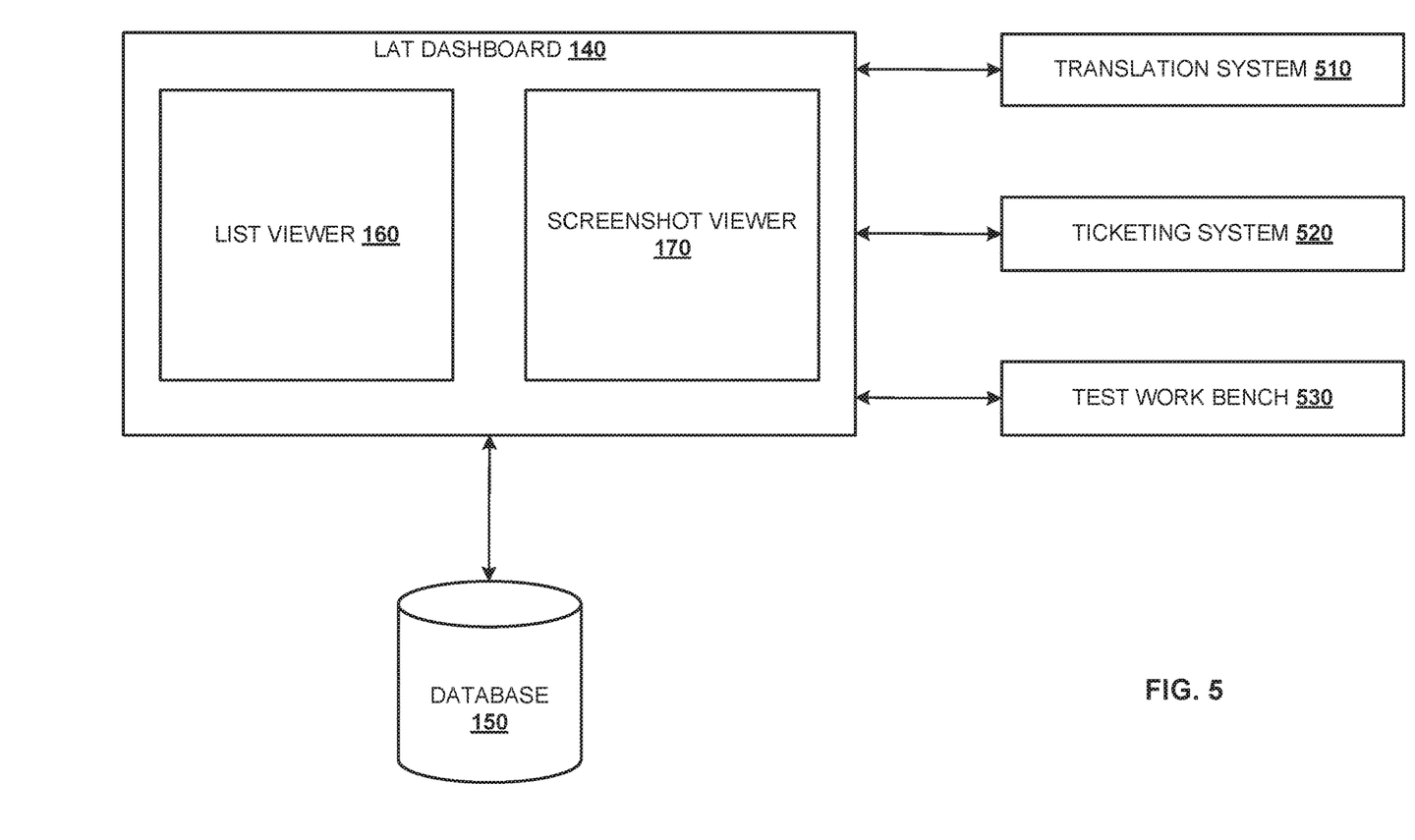
FIG. 5 is a block diagram illustrating translation system, ticketing system, and test work bench coupled to an LAT dashboard, according to an embodiment.

FIG. 5 illustrates an exemplarily LAT dashboard 140 coupled to various systems, according to an embodiment. The LAT dashboard 140 is used by the language testers. A language tester may be assigned a test case (test case ID or number). In an embodiment, the language tester can enter the assigned test case ID or number in LAT dashboard 140 interface (not shown). Once the test case number is entered, the LAT dashboard 140 communicates with the database 150 to retrieve one or more lists and screenshots stored for the corresponding test case. In an embodiment, based upon the test case number/ID, the LAT dashboard 140 identifies the language in which testing is to be performed and then rendering one or more lists and screenshots stored for the corresponding language from the database 150. In an embodiment, the language tester may select a language in which test is to be performed and based upon the selected language, the LAT dashboard 140 retrieves the one or more lists and screenshots stored for the corresponding language from the database 150. The retrieved lists are displayed in the list viewer 160 of the LAT dashboard 140 and the retrieved screenshots are displayed in screenshot viewer 170 of the LAT dashboard 140. The language tester can check the lists (e.g., compare the texts in base language and its corresponding one or more translations). In an embodiment, the language tester may also check the screenshots (in the base and the translated language) to check if the orientation, position, etc., of the text or UI elements are proper (e.g., same in the base and the translated language). In an embodiment, the screenshot in the base and translated language is provided side-by-side or in split window/screen within the screenshot viewer 170 so that the language tester can easily compare the screenshots. Therefore, the language tester can easily verify the UI elements of the translated language with the corresponding UI elements in the base language.

In case there is any translation issue, the language tester may access the translation system 510 and correct the translation. In case the language tester is not authorized to access the translation system 510 and/or there is any other issues (mismatch, discrepancy, or inconsistency in UI elements, etc.), the language tester may raise the issue through ticketing system 520. Therefore, based on language testers' authorization, they can either correct the translation issue by themselves or raise a ticket to notify the translation team or the development team about the issue. In an embodiment, the language tester may click a button (not shown) provided on the screenshot or the list, to raise the issue. In an embodiment, when the button is clicked, several options are displayed (e.g., through a drop-down to select from various types of errors/issues for which an incident may be raised) as described in detail in below FIG. 6. The result of the language testing (e.g., ticket raised, translation corrected, successful, etc.) may be automatically updated in test work bench 530.

Figure 6:
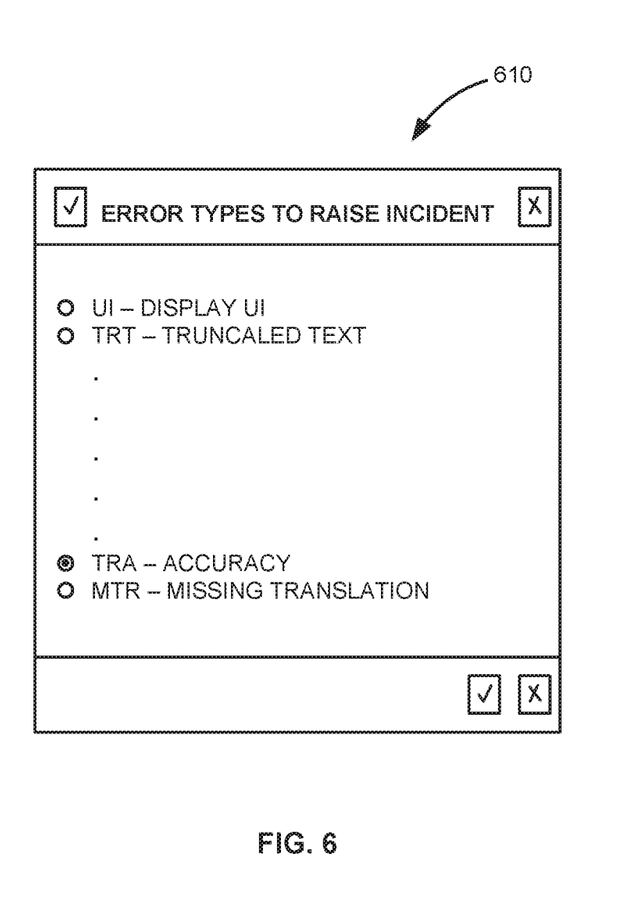
FIG. 6 illustrates an exemplarily drop-down menu providing various options to select type of error to raise an incident while performing language testing, according to an embodiment.

FIG. 6 illustrates an exemplarily drop-down menu 610 which provides various types of error for which an incident or ticket may be raised, according to an embodiment. For example, the drop-down menu 610 includes an error namely "display UI" (which indicates some problem related to display such as an orientation problem or mismatch in the text of the UI element in the base language and translated language screenshot), "truncated text" (which indicates that text is truncated in the translated language), "accuracy" (which indicates wrong translation), "missing translation" (which indicates that the text is not translated), etc. In an embodiment, the drop-down menu 610 is displayed when the language tester triggers or selects a button (not shown) for raising the incident or ticket. In an embodiment, when the ticket is raised from the list, the language tester can select one or more rows (texts) having issue, trigger the button for raising the ticket, and then select the type of error from the displayed drop-down menu 610 to raise an issue or incident.

In an embodiment, once the button is clicked to raise an issue, the metadata related to the screenshot is automatically retrieved from the database 150 and a ticket or incident is raised based upon the selected error type and by automatically including information (metadata) and/or associated screenshot (e.g., as an attachment).

In an embodiment, the LAT dashboard 140 may be communicatively coupled to test work bench (e.g., the test work bench 530 of FIG. 5). The test work bench is a system used by test coordinator to assign test cases (e.g., for language or translation testing) to the language testers and to maintain language test results or status of the test cases. As the test work bench can be accessed directly from the LAT dashboard 140, the tester can easily and directly confirm their assigned test cases from the LAT dashboard 140 itself (e.g., without switching to separate or another system). Further, the test case status or result may be, manually (e.g., by the language tester) or automatically, updated in the test work bench from the LAT dashboard 140. Therefore, the test coordinator can instantly or immediately receive or refer to the test case result from the test work bench.

Figure 7:
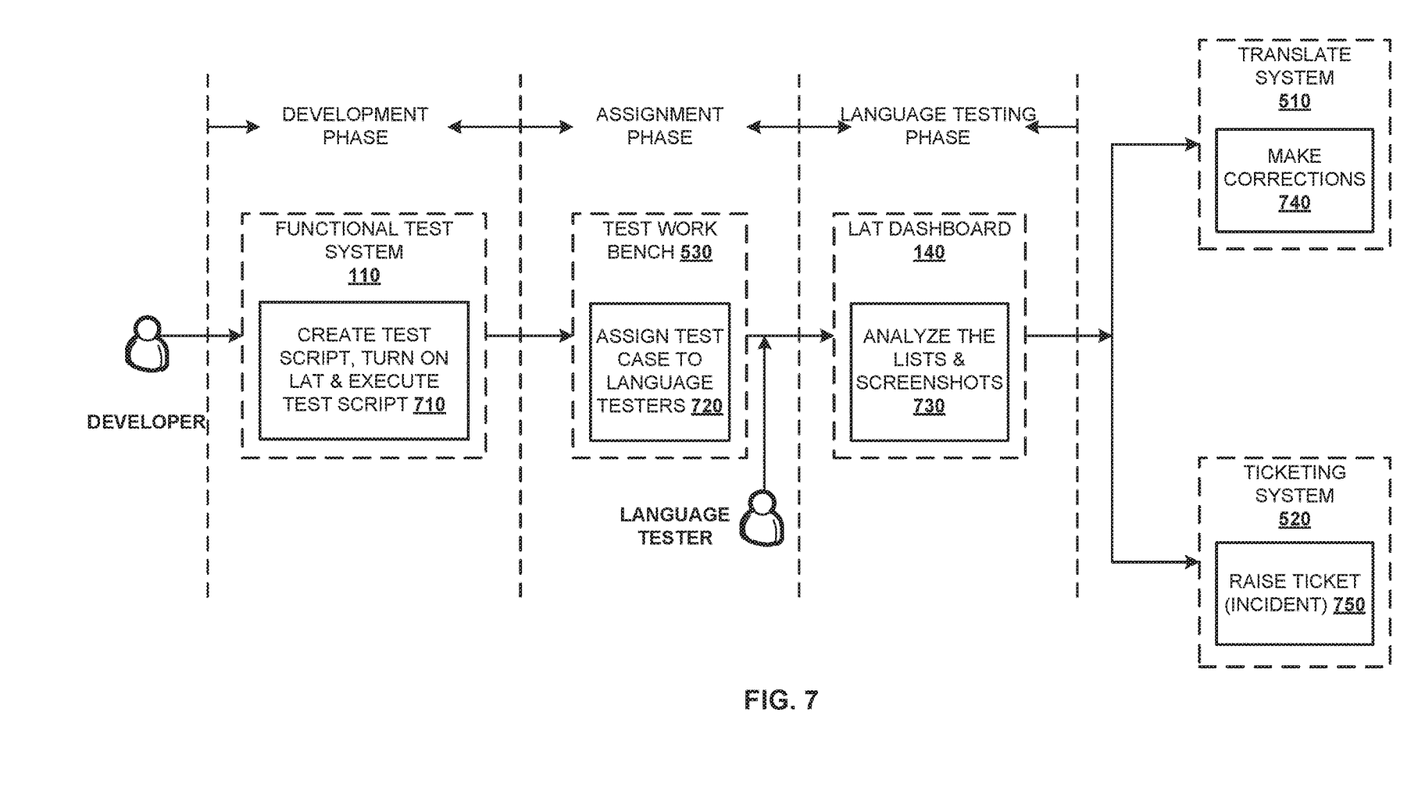
FIG. 7 is a sequence diagram illustrating an exemplarily optimized language acceptance testing, according to an embodiment.

FIG. 7 is a sequence diagram illustrating an exemplarily optimized language acceptance testing, according to an embodiment. A developer creates an application and its corresponding functional test script. The application is executed based upon the test script for performing functional testing of the application. In an embodiment, the functional testing of the application is a part of the development phase. At block 710, during the development phase, the developer or functional tester may start LAT before initiating functional testing in order to enable optimized language testing for the application later on. In an embodiment, to start LAT, an icon (e.g., LAT 220 of FIG. 2) provided on functional test system interface may be triggered. After starting the LAT, the developer or functional tester may execute the application (e.g., by triggering a button "execute 210" of FIG. 2). Once the application is executed based upon the test script (e.g., in the base language), various metadata related to the application is extracted and stored in a database (e.g., the database 150 of FIG. 1). As the LAT is switched ON, the application gets re-executed in other (foreign) languages upon execution in the base language and various screenshots of the application (e.g., screenshot of each UI) is automatically and, simultaneously or subsequently/successively, captured in the base language (e.g., English) and in multiple other (foreign) languages that application under functional test supports. The captured screenshots (e.g., in English, French, Dutch, etc.) are also stored in the database. A list (text comparator) is automatically generated for each captured UI or screenshot which includes texts (visible and non-visible texts) used in the UI, in the base language (e.g., English) and in corresponding other multiple (foreign) languages that application supports. The captured screenshots and generated lists are stored in the database and later provided for language testing to the language testers.

Once the functional testing is performed and various metadata, lists, screenshots of the application are stored in the database, a language test cases may be created (e.g., with test case numbers or IDs) for performing language testing of the application. In an embodiment, different test cases (numbers and IDs) may be assigned to different language testers for testing the application in respective different languages. In an embodiment, a language test coordinator may assign the test cases to various language testers for performing language testing in respective foreign language. The test case details or updates may be maintained in test work bench (e.g., the test work bench 530 of FIG. 5). At block 720, the test coordinator "assigns the test case to the language testers".

The language testers get the assigned test case details on the LAT dashboard. The language tester may enter the test case number or ID assigned to him for performing the test. In an embodiment, the language tester enters the test case number or ID and selects the language in which a test is to be performed. In an embodiment, from the assigned test case number or ID, the LAT dashboard identifies the language in which the testing is to be performed. Once the language is identified or selected, the lists and screenshots of the application in the base and the corresponding selected language is retrieved from the database and rendered or displayed on the LAT dashboard. In an embodiment, the list may be displayed on the list viewer 160 and the screenshots may be displayed on the screenshot viewer 170 of the LAT dashboard 140. At block 730, the language tester "analyze the lists and the screenshots". If there is any issue with the translation (e.g., wrong translation) and the language tester has authorization to access the translation system, the language tester may correct the translation, i.e., "make corrections" (block 740). At block 750, in case there is issues (e.g., mismatched text, inconsistent layout, missing translation, etc.) that developers need to handle and/or if the language tester is not authorized to access the translation system, the language tester may "raise an incident or ticket" to notify the development team or translation team to correct or address the error/issue. In an embodiment, once the issue is raised through the ticketing system (e.g., the ticketing system 520 of FIG. 5) and/or translation is corrected in the translation system, the language test case result (e.g., ticket raised, translation corrected, successful, etc.) may be updated, automatically or manually by the tester, in the test work bench so that the test coordinator can get the update about the test case. In an embodiment, the test coordinator may authorize or restrict the language tester(s) to access the translation system to make translation corrections.

Figure 8:
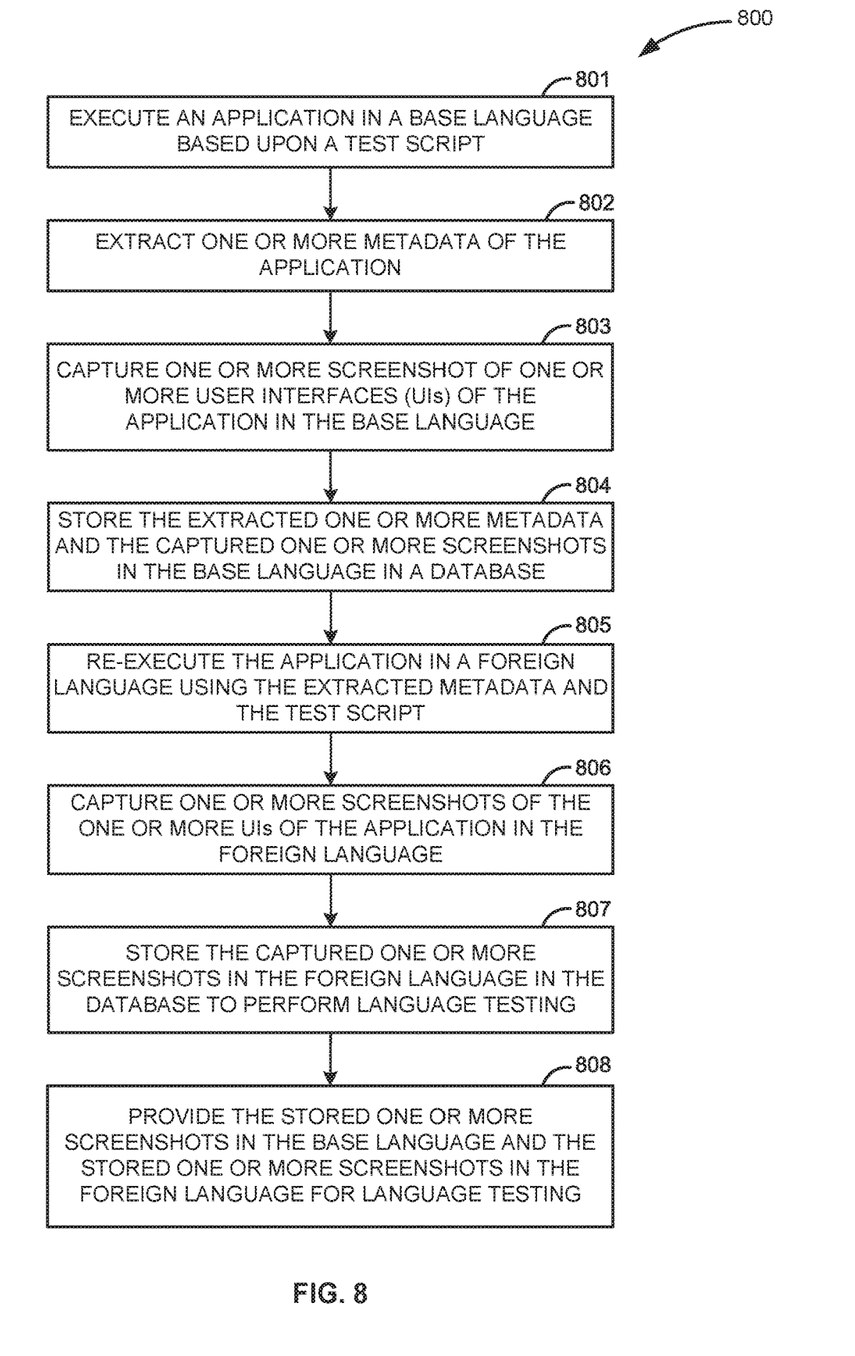
FIG. 8 is a flowchart illustrating method for enabling language acceptance testing (LAT) during functional testing of an application, according to an embodiment.

FIG. 8 is a flowchart illustrating process 800 to enable language acceptance testing (LAT) during functional testing of an application, according to an embodiment. A request may be received to activate or enable LAT during functional testing of the application. In an embodiment, enabling or activating LAT refers to capturing or collecting information which may help to perform language testing. A request may be received when a user triggers a LAT tab or button provided on functional test system (e.g., the functional test system 110 of FIG. 1). In response to the request, the LAT is activated. In an embodiment, once the LAT is enabled or activated, a communication or a connection is established or initiated between the functional test system and metadata extraction engine (e.g., the metadata extraction engine 120 of FIG. 1) and list_&_screen capturing engine (e.g., the list_&_screen capturing engine 130 of FIG. 1). Once the LAT is activated, the application may be executed to collect information for language testing. At 801, the application is executed in a base language based upon a test script. At 802, one or more metadata of the application is extracted. In an embodiment, the metadata of the application refers to metadata of one or more UI elements of the one or more UIs of the application. For example, a metadata of the application may be an x-path of the UI element (x-path is a unique identifier of the UI element which identifies the UI element irrespective of the language of the application). At 803, one or more screenshots of one or more user interfaces (UIs) of the application is captured in the base language. At 804, the extracted one or more metadata and the captured one or more screenshots are stored, in the base language, in a database. At 805, using the extracted one or more metadata and the test script, the application is re-executed in a foreign language. In another embodiment, the application may be re-executed in a plurality of foreign languages that the application supports. At 806, one or more screenshots of the one or more UIs of the application is captured in the foreign language. In an embodiment, the one or more screenshots of the one or more UIs of the application is captured in the plurality of foreign language that application supports. At 807, the captured one or more screenshots are stored in the foreign language, in the database. At 808, the stored one or more screenshots in the base language and the stored one or more screenshots in the foreign language(s) is provided for language testing. In an embodiment, a list for each captured UI or screenshot is also generated. The list comprises one or more visual and/or non-visual texts of a UI in the base language mapped to its corresponding one or more foreign languages equivalent. The generated lists are also stored in the database and provided to perform language testing. In an embodiment, the language testing may be performed by comparing the one or more screenshots in the base language with the one or more screenshots in the foreign language. In an embodiment, the language testing is performed using the stored lists, stored one or more screenshots in the base language, and the stored one or more screenshots in the foreign language(s).

Figure 9:
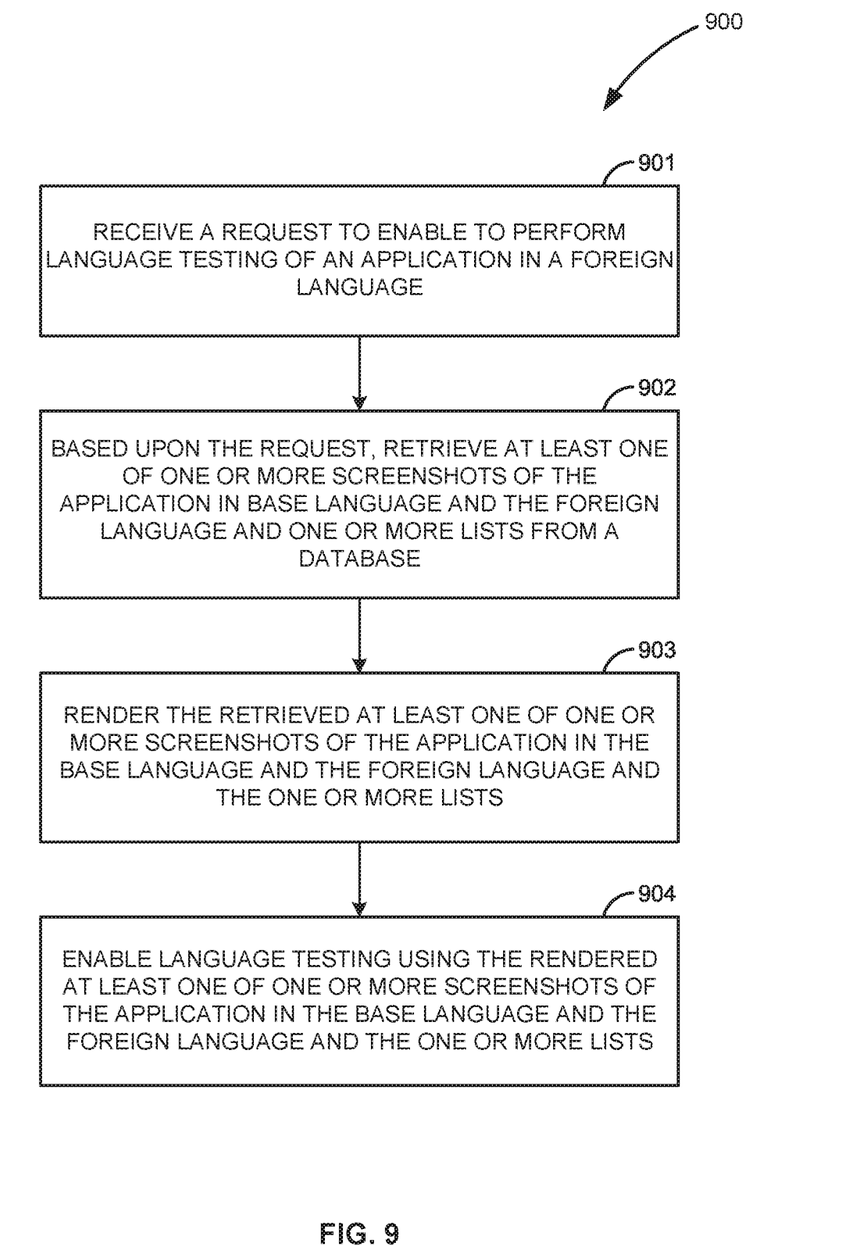
FIG. 9 is a flowchart illustrating method for performing optimized language testing, according to an embodiment.

FIG. 9 is a flowchart illustrating process 900 to enable to perform optimized language testing, according to an embodiment. At 901, a request is received to enable language testing of the application in the foreign language. The request is received from a language tester (e.g., through LAT dashboard). In an embodiment, the request comprises test case number or ID assigned to the language tester. In an embodiment, from the request (e.g., test case number or ID), a language (e.g., foreign language) in which a test is to be performed is identified. In an embodiment, the request itself includes the language for performing test (e.g., the language tester may specify the language in which test is to be performed). At 902, based upon the request, the stored one or more screenshots of the application in the base language and the language in which test is to be performed (foreign language) is retrieved from the database. In an embodiment, one or more lists associated to the application is also retrieved from the database. At 903, the retrieved one or more screenshots of the application in the base language and the foreign language is rendered on the LAT dashboard. In an embodiment, the one or more screenshots of the application in the base language are rendered side-by-side or adjacent to the one or more screenshots of the application in the foreign language. e.g., in screenshot viewer, on the LAT dashboard (e.g., the screenshot viewer 170 of the LAT dashboard 140 of FIG. 1). In an embodiment, the retrieved one or more lists are also rendered on the LAT dashboard (e.g., through list viewer 160 of the LAT dashboard 140 of FIG. 1). At 904, the language testing is enabled using the rendered at least one of the retrieved one or more screenshots of the application in the base language and the foreign language and the rendered one or more lists. For example, the language testing may be enabled by rendering the one or more screenshots of the application in the base language side-by-side or adjacent to the one or more screenshots of the application in the one or more foreign languages so that the screenshots may be easily compared by the language tester. In an embodiment, the language testing may be enabled by rendering the one or more lists comprising one or more texts of one or more UIs in the base language mapped to its corresponding foreign language equivalent so that the text translation may be easily checked or verified by the language tester.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" includes a single medium or multiple media that stores one or more sets of instructions. The term "computer readable storage medium" includes physical article that is capable of undergoing a set of physical changes to physically store, encode, or otherwise carry a set of instructions for execution by a computer system which causes the computer system to perform the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic indicator devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 10:
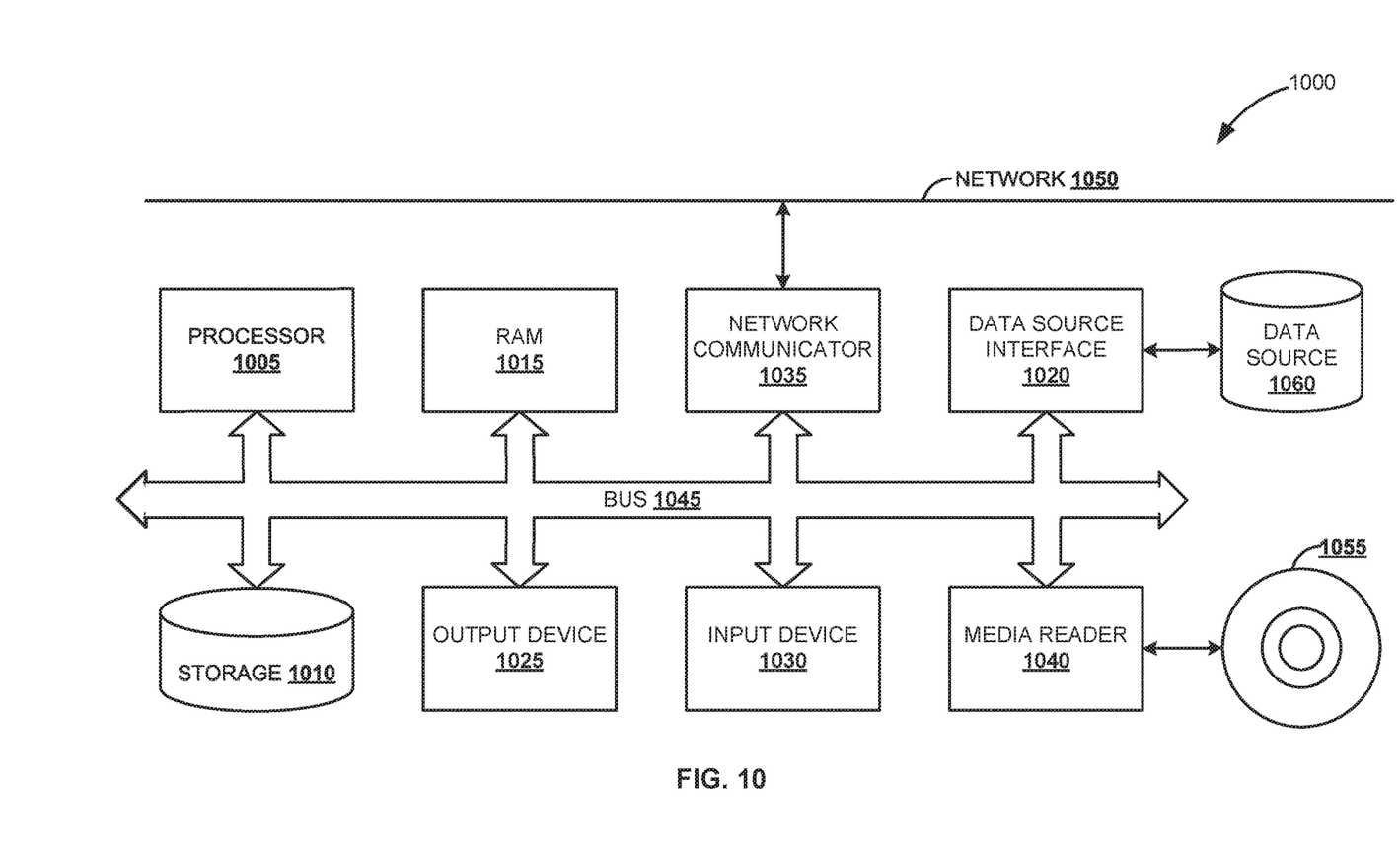
FIG. 10 is a block diagram illustrating an exemplary computer system, according to an embodiment.

FIG. 10 is a block diagram of an exemplary computer system 1000. The computer system 1000 includes a processor 1005 that executes software instructions or code stored on a computer readable storage medium 1055 to perform the above-illustrated methods. The processor 1005 can include a plurality of cores. The computer system 1000 includes a media reader 1040 to read the instructions from the computer readable storage medium 1055 and store the instructions in storage 1010 or in random access memory (RAM) 1015. The storage 1010 provides a large space for keeping static data where at least some instructions could be stored for later execution. According to some embodiments, such as some in-memory computing system embodiments, the RAM 1015 can have sufficient storage capacity to store much of the data required for processing in the RAM 1015 instead of in the storage 1010. In some embodiments, the data required for processing may be stored in the RAM 1015. The stored instructions may be further compiled to generate other representations of the instructions and dynamically stored in the RAM 1015. The processor 1005 reads instructions from the RAM 1015 and performs actions as instructed. According to one embodiment, the computer system 1000 further includes an output device 1025 (e.g., a display) to provide at least some of the results of the execution as output including, but not limited to, visual information to users and an input device 1030 to provide a user or another device with means for entering data and/or otherwise interact with the computer system 1000. The output devices 1025 and input devices 1030 could be joined by one or more additional peripherals to further expand the capabilities of the computer system 1000. A network communicator 1035 may be provided to connect the computer system 1000 to a network 1050 and in turn to other devices connected to the network 1050 including other clients, servers, data stores, and interfaces, for instance. The modules of the computer system 1000 are interconnected via a bus 1045. Computer system 1000 includes a data source interface 1020 to access data source 1010. The data source 1010 can be accessed via one or more abstraction layers implemented in hardware or software. For example, the data source 1010 may be accessed by network 1050. In some embodiments the data source 1010 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Database Connectivity (ODBC), produced by an underlying software system, e.g., an enterprise resource planning (ERP) system, and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the one or more embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiment are described herein for illustrative purposes, various equivalent modifications are possible within the scope of the embodiments, as those skilled in the relevant art will recognize. These modifications can be made to the embodiments in light of the above detailed description. Rather, the scope of the one or more embodiments is to be determined by the following claims, which are to be interpreted in accordance with established doctrines of claim construction.

What is claimed is:

1. A non-transitory computer-readable medium to store instructions, which when executed by a computer, causes the computer to:
    execute an application, in a base language, based upon a test script;
    extract one or more metadata of the application;
    capture one or more screenshots of one or more user interfaces (UIs) of the application in the base language;
    store the extracted one or more metadata and the captured one or more screenshots in the base language, in a database;
    using the extracted one or more metadata and the test script, re-execute the application in a foreign language supported by the application;
    capture one or more screenshots of the one or more UIs of the application in the foreign language;
    store the captured one or more screenshots in the foreign language, in the database; and
    provide the stored one or more screenshots in the base language and the stored one or more screenshots in the foreign language for language testing.

2. The non-transitory computer readable medium of claim 1 further comprising:
    automatically generating a list for each captured UI, wherein the list comprises one or more texts of a UI in the base language mapped to its corresponding foreign language equivalent; and
    storing the generated list in the database.

3. The non-transitory computer readable medium of claim 2, wherein the one or more texts includes at least one of:
    one or more visual texts of the UI; and
    one or more non-visual texts of the UI.

4. The non-transitory computer readable medium of claim 2 further comprising:
    receiving a request to enable to perform language testing of the application in the foreign language;
    based upon the request, retrieving at least one of:
        the stored one or more screenshots of the application in the base language and the foreign language from the database; and
        one or more lists corresponding to the captured one or more UIs from the database; and
    rendering the at least one of the retrieved one or more screenshots of the application in the base language and the foreign language and the retrieved one or more lists to enable to perform language testing.

5. The non-transitory computer readable medium of claim 4, wherein the one or more screenshots of the application in the base language are rendered side-by-side or adjacent to the one or more screenshots of the application in the foreign language.

6. The non-transitory computer readable medium of claim 4 further comprising:
    receiving a request for raising an incident or a ticket corresponding to an issue or error identified while performing language testing;
    based upon the request, displaying a drop-down menu providing option to select a type of identified issue or error;

based upon the selection, automatically retrieving metadata of an UI element for which the issue is raised, and a screenshot associated with the UI element;
based upon the selected type of error, generating a ticket including the retrieved metadata and the screenshot; and
automatically sending the generated ticket to a development team or translation team for correction.

7. The non-transitory computer readable medium of claim 4, wherein a result of the language testing including one of successfully completed, unsuccessful, ticket raised, translation corrected, is automatically updated in a test-work bench.

8. The non-transitory computer readable medium of claim 1, wherein the test script is generated in a development phase of the application and wherein the test script is generated by:
tracking a user's action and navigation steps while testing functionalities of the application in the development phase; and
recording the tracked user's action and navigation steps as the test script of the application.

9. The non-transitory computer readable medium of claim 1, wherein the metadata of the application refers to metadata of one or more UI elements of the one or more UIs of the application and wherein a metadata of an UI element comprises an x-path of the UI element.

10. The non-transitory computer readable medium of claim 9, wherein the x-path is a unique identifier of the UI element which identifies the UI element irrespective of the language of the application.

11. A computer-implemented method comprising:
executing an application, in a base language, based upon a test script;
extracting one or more metadata of the application;
capturing one or more screenshots of one or more user interfaces (UIs) of the application in the base language;
storing the extracted one or more metadata and the captured one or more screenshots, in the base language, in a database;
using the extracted one or more metadata and the test script, re-executing the application in a foreign language supported by the application;
capturing one or more screenshots of the one or more UIs of the application in the foreign language;
storing the captured one or more screenshots, in the foreign language, in the database; and
providing the stored one or more screenshots in the base language and the stored one or more screenshots in the foreign language for language testing.

12. The method of claim 11 further comprising:
automatically generating a list for each captured UI, wherein the list comprises one or more texts of a UI in the base language mapped to its corresponding foreign language equivalent; and
storing the generated list in the database.

13. The method of claim 12 further comprising:
receiving a request to enable to perform language testing of the application in the foreign language;
based upon the request, retrieving at least one of:
the stored one or more screenshots of the application in the base language and the foreign language from the database; and
one or more lists corresponding to the captured one or more UIs from the database; and
rendering the at least one of the retrieved one or more screenshots of the application in the base language and the foreign language and the retrieved one or more lists to enable to perform language testing.

14. The method of claim 13 further comprising:
receiving a request for raising an incident or a ticket corresponding to an issue or error identified while performing language testing;
based upon the request, displaying a drop-down menu providing option to select a type of identified issue or error;
based upon the selection, automatically retrieving metadata of an UI element for which the issue is raised, and a screenshot associated with the UI element;
based upon the selected type of error, generating a ticket including the retrieved metadata and the screenshot; and
automatically sending the generated ticket to a development team or translation team for correction.

15. The system of claim 12, wherein the test script is generated in a development phase of the application and wherein the test script is generated by:
tracking a user's action and navigation steps while testing functionalities of the application in the development phase; and
recording the tracked user's action and navigation steps as the test script of the application.

16. The system of claim 12, wherein the metadata of the application refers to metadata of one or more UI elements of the one or more UIs of the application and wherein a metadata of an UI element comprises an x-path of the UI element and wherein the x-path is a unique identifier of the UI element which identifies the UI element irrespective of the language of the application.

17. A computer system comprising:
at least one memory to store executable instructions; and
at least one processor communicatively coupled to the at least one memory, the at least one processor configured to execute the executable instructions to:
receive a request to enable a language acceptance testing (LAT) during functional testing of an application; and
in response to the request, activate the LAT to perform the following:
execute the application, in a base language, based upon a test script;
extract one or more metadata of the application;
capture one or more screenshots of one or more user interfaces (UIs) of the application in the base language;
store the extracted one or more metadata and the captured one or more screenshots, in the base language, in a database;
using the extracted one or more metadata and the test script, re-execute the application in a foreign language supported by the application;
capture one or more screenshots of the one or more UIs of the application in the foreign language;
store the captured one or more screenshots, in the foreign language, in the database; and
provide the stored one or more screenshots in the base language and the stored one or more screenshots in the foreign language for language testing.

18. The system of claim 17, wherein the at least one processor is further configured to execute the executable instructions to:

automatically generate a list for each captured UI, wherein the list comprises one or more texts of a UI in the base language mapped to its corresponding foreign language equivalent; and store the generated list in the database.

19. The system of claim 18 wherein the at least one processor is further configured to execute the executable instructions to:

receive a request to enable to perform language testing of the application in the foreign language;

based upon the request, retrieve at least one of:
  the stored one or more screenshots of the application in the base language and the foreign language from the database; and
  one or more lists corresponding to the captured one or more UIs from the database;
and
render the at least one of the retrieved one or more screenshots of the application in the base language and the foreign language and the retrieved one or more lists to enable to perform language testing.

20. The system of claim 19 wherein the at least one processor is further configured to execute the executable instructions to:

receive a request for raising an incident or a ticket corresponding to an issue or error identified while performing language testing;

based upon the request, display a drop-down menu providing option to select a type of identified issue or error;

based upon the selection, automatically retrieve metadata of an UI element for which the issue is raised, and a screenshot associated with the UI element;

based upon the selected type of error, generate a ticket including the retrieved metadata and the screenshot; and automatically send the generated ticket to a development team or translation team for correction.

* * * * *